Feb. 26, 1946.   L. T. E. THOMPSON ET AL   2,395,435
EMERGENCY CONTROL MECHANISM FOR AIRCRAFT
Filed Sept. 27, 1940
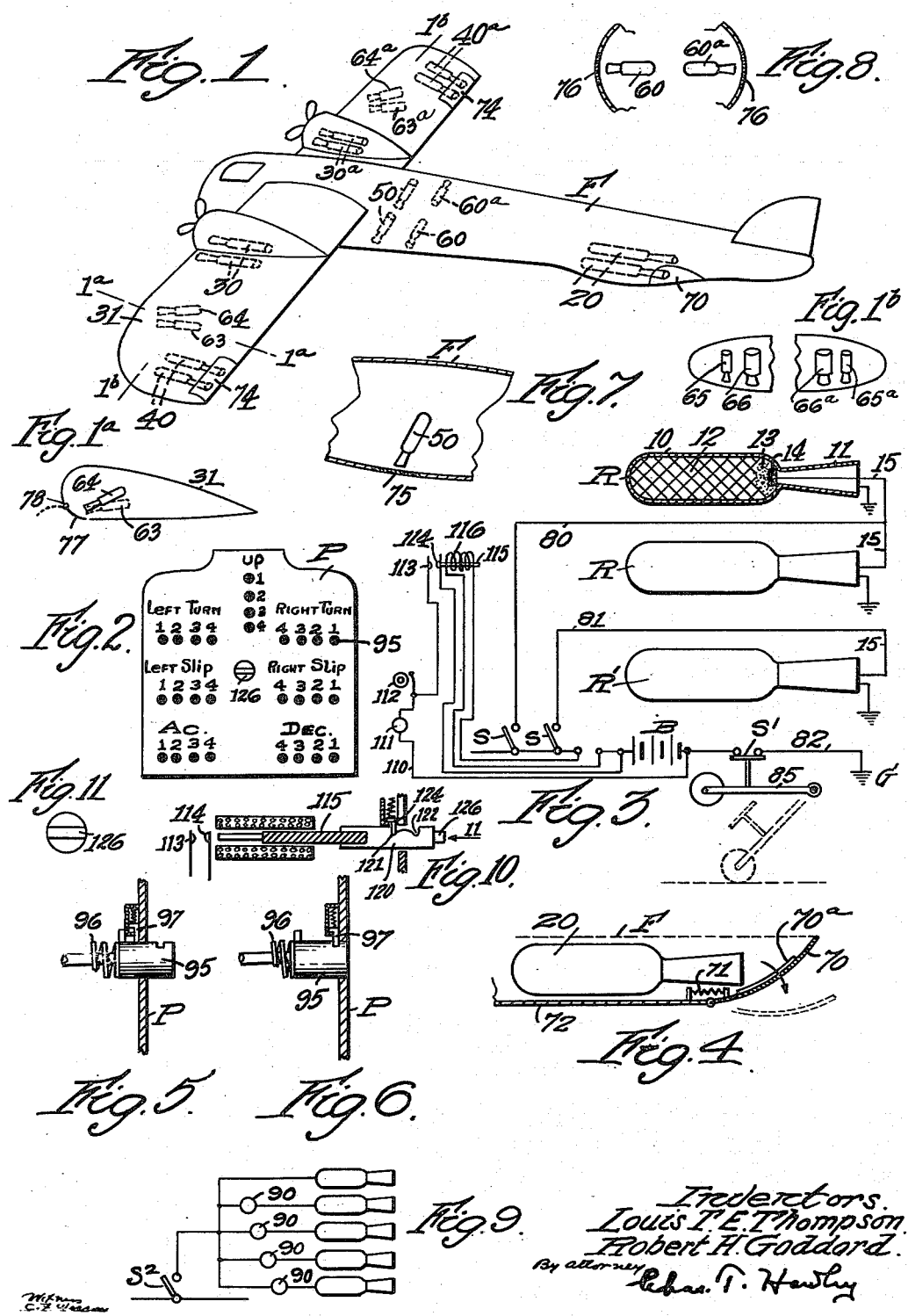
Inventors.
Louis T.E.Thompson
Robert H.Goddard.

Patented Feb. 26, 1946

2,395,435

UNITED STATES PATENT OFFICE 2,395,435

EMERGENCY CONTROL MECHANISM FOR AIRCRAFT

Louis T. E. Thompson, Dahlgren, Va., and Robert H. Goddard, Roswell, N. Mex.

Application September 27, 1940, Serial No. 358,594

7 Claims. (Cl. 244—52)

This invention relates to control mechanism for aircraft in flight, and is particularly designed for use in emergency when an abrupt change in either speed or direction of flight is necessary to avoid accident.

It is the general object of our invention to provide rocket means to give an aircraft an abrupt change in either speed or direction of movement.

More specific objects of the invention are to provide rocket means for quickly accelerating or decelerating an aircraft in flight; to provide rocket means for producing an abrupt upward lift of such a craft or an abrupt side slip in either direction; and to provide rocket means for quickly turning an aircraft to the right or to the left from its previous direction of flight.

We also provide improved means for selectively firing different rockets and for indicating the rockets which are still available for use. Another feature of the invention relates to provision for firing a plurality of rockets successively but at predetermined time intervals.

Our invention further relates to arrangements and combinations of parts which will be hereinafter described and more particularly pointed out in the appended claims.

A preferred form of the invention is shown in the drawing, in which

Fig. 1 is a perspective view of an airplane embodying our improvements;

Fig. 1$^a$ is a detail sectional view, taken along the line 1$^a$—1$^a$ in Fig. 1;

Fig. 1$^b$ is a sectional view, taken along the line 1$^b$—1$^b$ in Fig. 1 and showing a modified construction;

Fig. 2 is a front elevation of a control panel.

Fig. 3 is a diagrammatic view of certain control circuits and also shows one auxiliary rocket in section;

Fig. 4 is a detail sectional view of a streamlined casing for an auxiliary rocket;

Fig. 5 is a sectional elevation of a control button;

Fig. 6 is a similar view but showing the parts in a different position;

Fig. 7 is a fragmentary vertical section showing one of the lifting rockets;

Fig. 8 is a fragmentary transverse section showing side-slip rockets;

Fig. 9 is a diagrammatic view showing electrical connections for firing a bank of rockets successively and at predetermined intervals;

Fig. 10 is a detail sectional view of a switch-closing device; and

Fig. 11 is an end view, looking in the direction of the arrow 11 in Fig. 10.

Referring to the drawing, we have shown a conventional form of airplane provided with single wings and of any usual construction and method of propulsion. In different parts of this aircraft we provide auxiliary rockets R, which are preferably of the general construction shown in the upper part of Fig. 3.

Each rocket R comprises a combustion chamber 10 and a nozzle 11. The chamber 10 is filled with a suitable explosive 12, such as a high-energy smokeless powder, the charge preferably having a burning period of from one-half to one second. A small amount of black powder 13 may be provided adjacent a fuse 14 at the discharge end of the combustion chamber 10.

The fuse 14 is connected to a wire 15 and is also grounded through the chamber 10 or nozzle 11. When a current is passed through the wire 15 and fuse 14 to ground, the fuse is heated and the black powder is ignited and in turn communicates ignition to the main charge 12 of smokeless powder.

The rockets R are disposed in groups in different parts of the aircraft, as shown in Figs. 1, 7 and 8, and serve different specific purposes. Rockets 20, for instance, are disposed below the rear portion of the fuselage F and serve to deliver rearward jets of combustion gases to produce an abrupt increase in forward velocity.

Rockets 30—30a, disposed in the wings 31 at each side of the aircraft, provide forwardly directed jets which are effective to abruptly decelerate the aircraft. These rockets 30—30a are preferably fired in pairs, one on each side of the aircraft, to avoid turning moment.

A plurality of rockets 40—40a are provided near the outer ends of the wings 31 and discharge rearwardly. These rockets produce an abrupt and powerful turning moment, either to the right or to the left, the rockets 40 and 40a being selectively discharged.

Additional rockets 50 are disposed in the fuselage F and preferably near or forward of the center of gravity of the craft. These rockets 50 discharge downwardly and are preferably inclined forwardly as shown in Fig. 7. They are symmetrically disposed at opposite sides of the center line of the fuselage F and are preferably fired in pairs, one at each side of the center line. When thus discharged, they produce an abrupt lifting effect on the aircraft and also have a certain braking effect.

Rockets 60 and 60a are disposed at opposite sides of the fuselage and near the center of gravity of the craft and may be separately discharged to produce an abrupt side slip, either to the right or to the left.

Additional banking rockets 63, 63a, 64 and 64a (Figs. 1 and 1ᵃ may be provided for producing very quick right or left-hand turns, these rockets being preferably supplemental to the rockets 40 and 40a previously described.

The banking rockets are mounted in the wings 31. The rockets 63 and 63a are directed forwardly and also downwardly at a sudbstantial inclination, while the rockets 64 and 64a are similarly located but are most abruptly inclined. These banking rockets are used for raising the forward edges of both wings for a quick turn, but with more lift on one edge than on the other.

This banking effect, in an emergency, cannot be produced quickly enough by the usual controls, as there is no time for such mechanism to operate.

In Fig. 1ᵇ I have indicated a modified arrangement in which rockets 65, 65a, 66 and 66a are positioned similar to the rockets 63 and 64, but all inclined forwardly and downwardly at the same angle. The rockets 66 and 66a are, however, of larger size than the rockets 65 and 65a, so that the greater lift of one wing for banking may be conveniently secured by operating a large rocket on one side and a small rocket on the other.

While only one or two rockets for each of the described purposes are shown in the drawing for the sake of clearness, it will be understood that each group of rockets may comprise one or more banks each containing any desired number of rockets.

In order to preserve the streamline effect, the discharge openings in the aircraft casing adjacent the nozzles 11 are preferably provided with doors, as 70 (Fig. 4), lined with heat-resisting steel 70a to prevent melting, normally closed by springs 71. When the associated rocket is fired, the door swings yieldingly outward to the position shown in dotted lines in Fig. 4 and closes automatically after gas discharge has ceased.

The door 70 shown in Fig. 4 is associated with the accelerating rockets 20 in a streamline projection 72 below the fuselage F. Similar doors, as 74 (Fig. 1), 75 (Fig. 7) and 76 (Fig. 8), may be provided for other rockets. The doors 77 for the banking rockets 64, 65 or 66 are pivoted at 78 and are swung forward to the dotted line position shown in Fig. 1ᵃ against the air stream by the force of the rocket blast when one or more rockets are in operation.

The rockets may be conveniently fired by connecting the fuses 14 (Fig. 3) through wires 15 to connecting wires 80 or 81, which in turn are connected through switches S and a wire 82 to a battery B, safety switch S', and ground G. The switches S are selectively operated by the aircraft pilot, and each switch when closed may fire either a pair of rockets R or a single rocket R', as shown in Fig. 3.

The safety switch S' is preferably associated with the landing gear 85 in such manner that the switch will be closed only when the landing gear is raised or retracted during flight, thus making it impossible to fire any rocket while the craft is on the ground.

It is sometimes desirable to control a series of rockets from a single switch, as S² (Fig. 9), and to provide additional delayed-action switches or fuses 90 for the separate rockets. These switches or fuses are of commercial construction and will operate at different time intervals, so that the separate rockets in said series will be discharged at definite successive intervals, rather than simultaneously. Such successive discharge is desirable to reduce the strain on the aircraft structure which would be caused by simultaneous discharge of a large number of rockets.

All of the rockets are preferably controlled from a panel P (Fig. 2) in which the switches S or S² are controlled by push buttons 95, which may desirably be of the construction shown in Figs. 5 and 6. These buttons normally project outward from the panel P and each button closes its associated switch S or S² when pushed inward from the position shown in Fig. 5 to the position shown in Fig. 6.

Springs 96 hold the buttons yieldingly in outward position, and spring-operated latches 97 hold each button in inward position after it has been pushed inward to close a switch. Consequently, the buttons 95 which remain in outward position on the panel P indicate very clearly the auxiliary rockets remaining undischarged and available for emergency use in the aircraft. Obviously the pilot can push any desired number of buttons successively to discharge as many rockets or banks of rockets in any group as may be necessary to produce a desired effect.

Also, the buttons in each series may be connected to increasing numbers of rockets, so that the first button will fire a single rocket, the second will fire two, the third three and so on, thus providing a cumulative increase in the correcting force.

By this simple arrangement, abrupt and substantial changes in position or operation of an aircraft may be produced by rocket impulse to meet emergencies which may arise. The craft can be lifted, accelerated, decelerated, turned to the right or to the left, or caused to side-slip to the right or to the left at the will of the pilot. The magnitude and duration of the impulses may also be varied and selectively controlled. After an emergency has been met, the remaining rockets are still available for use, should another emergency arise.

The rocket control mechanism above described necessarily acts very quickly, as it is intended for use in emergency only, and the resulting abrupt changes in speed or direction may be quite disturbing to passengers, who should preferably be warned that such an abrupt change is initiated. We have accordingly provided means which will now be described for automatically giving a caution signal whenever rocket control is applied.

For this purpose, we provide a shunt circuit 110 (Fig. 3) which includes a light 111, a bell 112, and a pair of contact points 113 and 114. The contact point 113 is fixed but the contact point 114 is movably mounted and is moved to closed position by a plunger 115 actuated by a solenoid coil 116. The coil is so connected that current will flow through the solenoid coil whenever the safety switch S' and any one of the control switches S are closed. Both visible and audible signals are thus put in operation automatically whenever the operator closes one of the control switches S during flight.

In Figs. 10 and 11 we have shown a latch device for holding the signal circuit closed until manually released. We provide the solenoid plunger 115 with an extension 120 having spaced recesses 121 and 122 to receive a spring-actuated latch 124 by which the solenoid plunger 115 will be held yieldingly in either operative or inoperative position. The extension 120 may have a handle 126 by which it may be manually withdrawn to outer or inoperative position. The handle 126 may be located on the panel P, so that the signals may be conveniently released by the operator after the emergency has passed.

Having thus described our invention and the advantages thereof, we do not wish to be limited to the details herein disclosed, otherwise than as set forth in the claims, but what we claim is:

1. In an aircraft having an elongated body, wings with streamlined casings and normal power means of propulsion, that improvement which comprises pairs of auxiliary rockets, one pair on each side of said craft and each rocket supplying an impulse along its axis, said auxiliary rockets being mounted in the wings and sufficiently remote from the aircraft body to give a strong turning moment about the longitudinal axis of said craft and being disposed wholly within the streamlined casings of said wings, the rockets of each pair being directed and discharging forwardly and downwardly but at different fixed angles, the more sharply inclined rockets being effective to apply a strong lift on their associated wings and the less inclined rockets being effective to apply more moderate lifting forces to their associated wings, and a single means to simultaneously and substantially instantaneously fire selected rockets under manual control to produce a sudden banking action.

2. In an aircraft having an elongated body, wings with streamlined casings and normal power means of propulsion, that improvement which comprises pairs of auxiliary rockets, one pair on each side of said craft and each rocket supplying an impulse along its axis, said auxiliary rockets being mounted in the wings and sufficiently remote from the aircraft body to give a strong turning moment about the longitudinal axis of said craft and each rocket being disposed wholly within the streamlined casings of said wings, all of said rockets being directed and discharging forwardly and downwardly and the rockets of each pair being of substantially different but predetermined power, and a single means to simultaneously and substantially instantaneously fire selected rockets of different powers under manual control, whereby a stronger corrective banking force can be applied to one wing and a lesser banking force can be simultaneously applied to the other wing and with said forces in a predetermined ratio of effectiveness.

3. In an aircraft having normal power means of propulsion, that improvement which comprises a plurality of auxiliary rockets mounted in fixed positions in said craft and effective to provide orrective impulses, means to fire a selected series of said rockets under a single manual control, nd selectively timed delayed-action fuse elements in said rockets effective to provide predetermined time intervals between the firing of successive rockets in said series.

4. In an aircraft having normal power means of propulsion, that improvement which comprises a plurality of auxiliary rockets mounted in fixed positions in said craft, streamlined casings enclosing said rockets, doors in said casings opened by the rocket blast, and yielding means to hold said doors normally closed.

5. In an aircraft having normal power means of propulsion, that improvement which comprises a plurality of auxiliary rockets mounted in fixed positions within the wings of said craft and spaced equally and substantially at each side from the fuselage and all discharging at a forward and downward inclination, certain of said rockets at each side being more effective in banking lift and the others being less effective in banking lift, and a single manually-controlled means to discharge said rockets simultaneously and substantially instantaneously in pairs comprising a rocket of greater lift at one side of the fuselage and a rocket of less lift at the other side, whereby a sharp banking turn is effected by corrective forces of predetermined and different relative corrective values.

6. In an aircraft having normal power means of propulsion, that improvement which comprises a plurality of auxiliary rockets mounted in fixed positions within the wings of said craft and spaced equally and substantially at each side from the fuselage and all discharging at a forward and downward inclination, certain of said rockets at each side having a greater fixed inclination to the longitudinal axis of the plane and the others having a less inclination, and manually-controlled means to simultaneously and substantially instantaneously discharge said rockets in pairs comprising one of greater inclination at one side and one of less inclination at the other, whereby a sharp banking turn is effected by corrective forces applied at predetermined and different inclinations.

7. In an aircraft having normal power means of propulsion, that improvement which comprises a plurality of auxiliary rockets mounted in fixed positions within the wings of said craft and spaced equally and substantially at each side from the fuselage and all discharging at a forward and downward inclination, certain of said rockets at each side having greater power and the remaining rockets on said side having less power, and means to simultaneously and substantially instantaneously discharge said rockets in pairs comprising a more powerful rocket on one side and a less powerful rocket on the other side, whereby a sharp banking turn is effected by corrective forces of predetermined and different relative powers.

LOUIS T. E. THOMPSON.
ROBERT H. GODDARD.